Dec. 13, 1927.
C. EURIT
1,652,617
PIN ATTACHMENT FOR CRANKS
Filed May 12, 1927
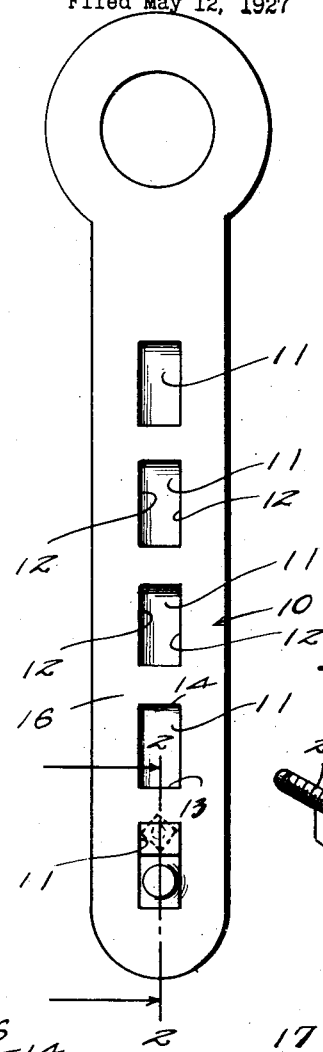
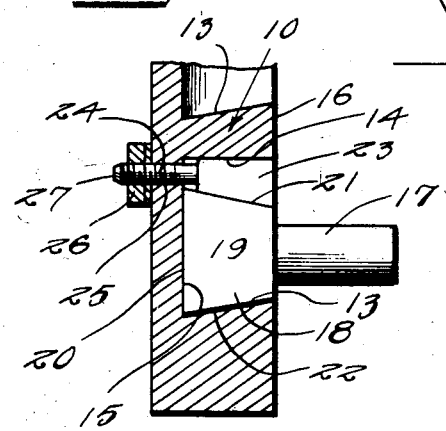
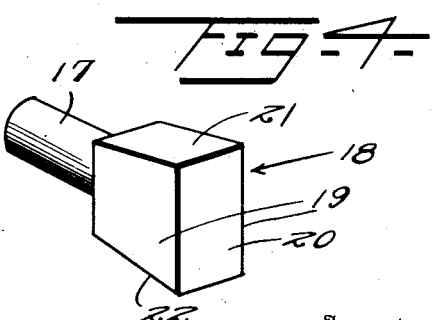
Inventor
Carl Eurit
By Ulric S. J Dunbar Jr.
Attorney Patented Dec. 13, 1927.

1,652,617

UNITED STATES PATENT OFFICE.

CARL EURIT, OF TULSA, OKLAHOMA, ASSIGNOR TO EURIT SPECIALTY CORPORATION, OF TULSA, OKLAHOMA, A CORPORATION OF OKLAHOMA.

PIN ATTACHMENT FOR CRANKS.

Application filed May 12, 1927. Serial No. 190,855.

This invention relates to a pin attachment for cranks and the like.

An important object of the invention is to produce a construction whereby a pin may be attached to a crank or the like in such manner that it will be very rigidly connected therewith and will, at the same time, be so mounted that it may be readily removed therefrom to be arranged in a new position or replaced by a second structure.

A further and more specific object of the invention is the provision of a connection between the wrist pins and cranks of oil well drilling apparatus, of such character that the wrist pin may be readily shifted to give the desired stroke length of the crank in operation, which, while permitting ready adjustment of the wrist pin, does not in any way weaken the crank or provide a structure which is in any way liable to become loosened in operation.

These and other objects I attain by the construction shown in the accompanying drawings, wherein for the purpose of illustration is shown a preferred embodiment of my invention and wherein:—

Figure 1 is a front elevation of a crank having a pin adjustably mounted therein in accordance with my invention;

Figure 2 is a section on the line 2—2 of Figure 1;

Figure 3 is a perspective of the wedge;

Figure 4 is a perspective view of the pin and its base.

Referring now more particularly to the drawing, the numeral 10 indicates the operating crank of oil well drilling apparatus which, in accordance with my invention, is provided with a series of longitudinally spaced recesses 11. Each recess 11 has parallel side walls 12, which extend longitudinally of the crank and transversely directed end walls 13 and 14, which diverge toward the bottom wall 15 of the socket. The end wall 14 is, however, perpendicular to both the face 16 of the crank to which the sockets open and to the bottom wall of the associated socket.

The pin 17 is provided with a base, in the form of a block of metal 18 having parallel side faces 19 spaced apart a distance such that they have a sliding fit between the faces 12, a flat bottom face 20 and oppositely inclining end faces 21 and 22, which converge toward the upper or pin bearing face of the base. At least one of these end faces and preferably both thereof have the same angle to the bottom face 20 as that of the end faces 13 to the bottom faces 15 of the recesses. A wedge 23 is provided which preferably has a sliding fit between the side wall faces 12 of the recesses and which is adapted to be placed between the exposed face of the base 18 of the pin and the wall 14 of the recess in which this base is arranged. The end faces of the wedge or those faces extending transversely of the crank, when the wedge is in position, fit against the end faces of the base and recess and force the confronting end face of the base into close engagement with the end wall 13 of the recess.

In order to provide for ready adjustment of this wedge into the recess, the wedge is provided upon its inner end with a threaded extension 24 passing through an opening 25 formed at the bottom wall of the recess and having mounted thereon at the opposite face of the crank from that through which the recesses 11 open, an adjusting nut 26. The extremity of the threaded extension 24 is tapered, as at 27, so that an implement may be impacted thereagainst to loosen the wedge and permit its removal from the recess. It will, of course, be understood that as long as the wedge is positioned together with the base in a recess 11, the removal of the base 18 is impossible and, therefore, even should the wedge become loosened, it will not permit the base to escape and cause possible damage to the rigging or the drilling apparatus.

Since the construction hereinbefore set forth is obviously capable of a certain range of change and modification without materially departing from the spirit of the invention, I do not limit myself to such specific structure except as hereinafter claimed.

I claim:—

1. In a pin attachment for cranks and the like and in combination, a recess formed in one face thereof, the recess having an undercut end wall, a block fitting between the side walls of the recess having an end wall to engage and fit against the undercut end wall of the recess, means in the recess between the opposite end wall of the block and the opposed end wall of the recess for urging said block longitudinally of the recess toward the undercut face thereof and a pin carried by said block and projecting from the recess.

2. In a pin attachment for cranks and the like and in combination, a recess formed in one face thereof, the recess having an undercut end wall, a block fitting between the side walls of the recess having an end wall to engage and fit against the undercut end wall of the recess, means in the recess between the opposite end wall of the block and the opposed end wall of the recess for urging said block longitudinally of the recess toward the undercut face thereof and a pin carried by said block and projecting from the recess, the undercut wall of the recess being at an angle to the bottom of the recess whereby the block when forced into engagement therewith is wedged downwardly for engagement with the bottom of the recess.

3. In a pin attachment for cranks and the like and in combination, a recess formed in one face thereof, the recess having an undercut end wall, a block fitting between the side walls of the recess having an end wall to engage and fit against the undercut end wall of the recess, means in the recess between the opposite end wall of the block and the opposed end wall of the recess for urging said block longitudinally of the recess toward the undercut face thereof and a pin carried by said block and projecting from the recess, the undercut wall of the recess being at an angle to the bottom of the recess whereby the block when forced into engagement therewith is wedged downwardly for engagement with the bottom of the recess, said means by its engagement with the opposite end wall of the block likewise urging the opposite end of the block downwardly toward the bottom of the recess.

4. In a pin attachment for cranks and the like and in combination, a member having a recess formed in one face thereof, the recess having a flat bottom and parallel side walls, one end wall of the recess being slantingly undercut, a block fitting between the side walls of the recess and having a flat bottom, the end wall of the block confronting the undercut wall of the recess and having a similar slant to said wall, the opposite end wall of the block being oppositely slanted, a wedge fitting between the opposite end wall of the recess and the last named end wall of the block and means for urging said wedge toward the bottom of the recess.

5. In a pin attachment for cranks and the like and in combination, a member having a recess formed in one face thereof, the recess having a flat bottom and parallel side walls, one end wall of the recess being slantingly undercut, the opposite wall thereof being perpendicular to the bottom wall, a block fitting between the side walls of the recess and having a flat bottom, the end wall of the block confronting the undercut wall of the recess and having a similar slant to said wall, the opposite end wall of the block being oppositely slanted, a wedge fitting between the opposite end wall of the recess and the last named end wall of the block and means for urging said wedge toward the bottom of the recess.

6. In a pin attachment for cranks and the like and in combination, a member having a recess formed in one face thereof, the recess having a flat bottom and parallel side walls, one end wall of the recess being slantingly undercut, the opposite wall thereof being perpendicular to the bottom wall, a block fitting between the side walls of the recess and having a flat bottom, the end wall of the block confronting the undercut wall of the recess and having a similar slant to said wall, the opposite end wall of the block being oppositely slanted, a wedge fitting between the opposite end wall of the recess and the last named end wall of the block, means for urging said wedge toward the bottom of the recess, comprising a threaded extension on the wedge directed through an opening formed through the bottom wall of the recess and a nut mounted upon said extension at the opposite side of the member from that through which the recess opens.

7. In a pin attachment for cranks and the like and in combination, a member having a recess formed in one face thereof, the recess having a flat bottom and parallel side walls, one end wall of the recess being slantingly undercut, the opposite wall thereof being perpendicular to the bottom wall, a block fitting between the side walls of the recess and having a flat bottom, the end wall of the block confronting the undercut wall of the recess and having a similar slant to said wall, the opposite end wall of the block being oppositely slanted, a wedge fitting between the opposite end wall of the recess and the last named end wall of the block, means for urging said wedge toward the bottom of the recess, comprising a threaded extension on the wedge directed through an opening formed through the bottom wall of the recess and a nut mounted upon said extension at the opposite side of the member from that through which the recess opens, the free end of said extension being tapered.

In testimony whereof I affix my signature.

CARL EURIT.